(12) United States Patent
DeFranks et al.

(10) Patent No.: US 7,174,613 B2
(45) Date of Patent: Feb. 13, 2007

(54) METHOD FOR MANUFACTURING A FOAM CORE HAVING CHANNEL CUTS

(75) Inventors: Michael S. DeFranks, Decatur, GA (US); Richard F. Gladney, Fairburn, GA (US); Neal C. Van Patten, Northampton, MA (US)

(73) Assignee: Dreamwell Ltd, Las Vegas, NV (US)

( * ) Notice: Subject to any disclaimer, the term of this patent is extended or adjusted under 35 U.S.C. 154(b) by 0 days.

(21) Appl. No.: 10/964,476

(22) Filed: Oct. 13, 2004

(65) Prior Publication Data

US 2005/0173826 A1 Aug. 11, 2005

Related U.S. Application Data

(60) Provisional application No. 60/511,372, filed on Oct. 14, 2003.

(51) Int. Cl.
*B68G 7/00* (2006.01)
*B26D 3/00* (2006.01)
(52) U.S. Cl. .................. 29/91.1; 29/557; 29/558; 83/874; 83/176; 83/425; 83/19; 264/138; 264/321
(58) Field of Classification Search .............. 29/91, 29/91.1, 557, 558; 83/19, 874, 176, 425, 83/435, 856, 435.2; 264/138, 163, 321
See application file for complete search history.

(56) References Cited

U.S. PATENT DOCUMENTS

| | | | |
|---|---|---|---|
| 3,331,803 A | 7/1967 | Blaschke | |
| 4,603,445 A * | 8/1986 | Spann | 5/736 |
| 4,620,337 A | 11/1986 | Williams et al. | |
| 4,673,452 A | 6/1987 | Awdhan | |
| 4,686,724 A | 8/1987 | Bedford | |
| 4,700,447 A * | 10/1987 | Spann | 29/418 |
| D307,687 S * | 5/1990 | Raburn | D6/606 |
| D307,688 S * | 5/1990 | Schaefer | D6/606 |
| D307,689 S * | 5/1990 | Schaefer | D6/606 |
| D307,690 S * | 5/1990 | Raburn | D6/606 |
| 4,955,096 A * | 9/1990 | Gilroy et al. | 5/730 |
| 5,010,609 A * | 4/1991 | Farley | 5/730 |
| 5,077,849 A * | 1/1992 | Farley | 5/730 |
| 5,111,542 A * | 5/1992 | Farley | 5/727 |
| 5,115,527 A * | 5/1992 | Medley | 5/731 |
| 5,160,785 A * | 11/1992 | Davidson, Jr. | 428/316.6 |
| 5,178,811 A | 1/1993 | Farley | |
| 5,477,573 A * | 12/1995 | Bonaddio et al. | 5/736 |
| 5,534,208 A * | 7/1996 | Barr et al. | 264/160 |
| 5,688,538 A * | 11/1997 | Barr et al. | 425/299 |
| 5,819,631 A * | 10/1998 | Denney | 83/874 |
| 5,960,497 A * | 10/1999 | Castellino et al. | 5/730 |
| 6,085,627 A * | 7/2000 | Denney | 83/874 |
| 6,142,053 A * | 11/2000 | Denney et al. | 83/874 |
| 6,173,638 B1 * | 1/2001 | Denney | 83/874 |
| 6,372,076 B1 * | 4/2002 | Ogle | 156/254 |

(Continued)

*Primary Examiner*—Essama Omgba
(74) *Attorney, Agent, or Firm*—Fish & Neave IP Group, Ropes & Gray LLP

(57) ABSTRACT

A method of manufacturing a mattress including providing a foam block, convoluting the foam to form a tongue extending longitudinally along the foam block, and removing at least a portion of the tongue, to thereby form a channel within the foam block.

23 Claims, 5 Drawing Sheets

U.S. PATENT DOCUMENTS

| | | | |
|---|---|---|---|
| 6,467,386 B1 * | 10/2002 | Denney | 83/874 |
| 6,513,414 B1 * | 2/2003 | Denney et al. | 83/874 |
| 6,546,836 B1 * | 4/2003 | Denney et al. | 83/874 |
| 6,588,086 B2 * | 7/2003 | Trybus | 29/557 |
| 6,668,698 B1 * | 12/2003 | Denney | 83/874 |
| 6,675,691 B1 * | 1/2004 | Denney | 83/874 |
| 6,694,554 B2 * | 2/2004 | Bullard | 5/655.8 |
| 7,048,879 B2 * | 5/2006 | Kobayashi et al. | 264/45.4 |
| 2006/0043642 A1 * | 3/2006 | Yang | 264/321 |

* cited by examiner

METHOD FOR MANUFACTURING A FOAM CORE HAVING CHANNEL CUTS

RELATED APPLICATION

This application claims the benefit of U.S. Provisional Application No. 60/511,372, filed Oct. 14, 2003, the entire contents of which are incorporated herein by reference.

BACKGROUND OF THE INVENTION

Today in Europe many mattresses that are sold commercially are made with foam inner cores. In such mattresses, the interior main body that provides support to the user is a block of foam that is sufficiently soft yet supportive to provide a comfortable sleep.

An alternative common type of mattress has an inner spring assembly formed of spring coils that provide a resilient support surface for the user. Spring coil mattresses can be open coil or Marshall that provide a durable high quality mattress product.

In recent years, certain new products have been developed that combine both foam core mattresses with inner spring assemblies to provide foam mattresses that have spring coils incorporated within the foam core. In one example, a foam block is provided that can act as the mattress core. A set of bore holes are formed into the foam block either by drilling or molding, but in either case, the bore holes are configured to receive spring coils that can be placed therein. Typically, the spring coils are dimensioned to fit within the bore holes so that the top of the spring coil is at the same height as the top of the foam core. In this way, the resultant mattress has the benefits of both a foam core mattress and a spring coil mattress. In other products, channels are cut into the foam to provide a trough in which spring coils, including Marshall spring coils, can be disposed.

Although these combination mattresses provide many benefits, the process of actually forming a foam core mattress that can receive spring coils either through bore holes or channels is complicated and costly. Accordingly, there is a need in the art for improved methods for manufacturing foam cores, and in particular for manufacturing foam cores that have spaces or voids into which additional components may be fitted.

SUMMARY OF THE INVENTION

The systems and methods described herein include, among other things, methods for manufacturing a foam core of the kind suitable for use with a mattress, seat cushion, car seat, or other type of furniture product.

More particularly, the systems and methods described herein include methods for manufacturing a foam core that comprise the steps of providing a foam block, convoluting the foam block to form a tongue extending longitudinally along the foam block, and removing at least a portion of the formed tongue to thereby form a void within the foam block. In certain optional and preferred embodiments, the portion of the tongue is removed to provide a void in the form of a square, a trough, a channel, a bore hole, or some other selected shape or combination of shapes.

In certain embodiments, the foam block is convoluted and the tongue is removed to form channels that extend across the length or the width of the foam block. The channels are dimensionally adapted to receive and hold an alternate support component. In one example, the alternate support component includes a spring coil or string of spring coils that may be either open coil by design or Marshal coil. In other alternate embodiments, the support component is a foam block having a different density (ILD) or some other characteristic that is desired to incorporate into the foam block. In either case, the foam core having the channels extending there through, is further processed so that a foot piece is attached to the foot end of the foam core block and a head piece is attached to the head end of the foam core. In one practice, the head piece and foot piece are attached by gluing separate pieces of foam to the head and foot end of the foam block core. In other embodiments, the head section and foot section are formed during the convolution process by limiting the channel cuts to a length less than the longitudinal length of the foam core.

BRIEF DESCRIPTION OF THE DRAWINGS

The following figures depict certain illustrative embodiments of the invention in which like reference numerals refer to like elements. These depicted embodiments are to be understood as illustrative of the invention and not as limiting in any way.

DETAILED DESCRIPTION OF THE ILLUSTRATED EMBODIMENTS

The systems and methods described herein include, among other things, foam core assemblies and methods for manufacturing such foam core assemblies wherein voids are formed within a block of foam. As described in more detail hereinafter the voids are formed within the block of foam by passing a foam block into a convoluter and having the convoluter create lengthwise voids within the foam core. Optionally, the lengthwise voids extend the full-length of the foam block and the foam block is dimensioned to act as a foam core for a conventional mattress such as a king, queen, Olympic Queen, California King, twin or extended twin mattress. In other embodiments, the voids formed within the foam block extend only partially along the length of the foam block or are discrete, such as bore holes, rectangular cut-outs, or any other geometry that might be formed by the methods and systems described herein. In further optional embodiments, the foam core block is processed to provide channels that extend along the width of the foam core block. As further described in more detail below, the voids formed within the foam block may be filled with support elements, such as spring coils, foams of different density and firmness, latex, water bags, or any other kind of support element that may be fitted within the voids and capable of providing support to a user.

Figure 1:
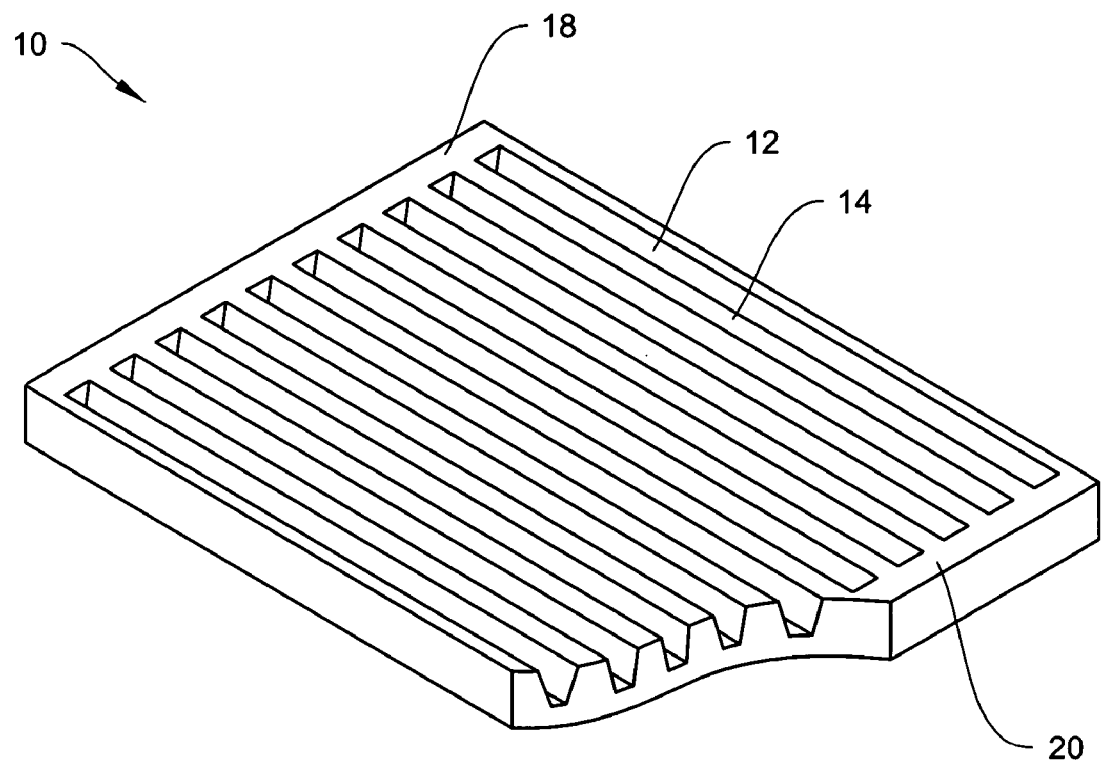
FIG. 1 depicts one embodiment of a foam core according to the invention.

Turning to FIG. 1, one embodiment of a foam core formed according to the methods described herein is depicted. Specifically, FIG. 1 depicts a foam core 10 having a plurality of voids 12. Between each void 12 is a support rail 14 that extends between a head-piece 18 and a foot-piece 20. FIG. 1 provides a cross-sectional view of the channel shaped voids 12 and depicts that in this embodiment the voids 12 have a trapezoidal profile that extends through a portion of the length of the core 10. As further shown in FIG. 1, the head-piece 18 and foot-piece 20 are integrally formed into the foam core by forming cresting voids 12 that extend partially across the length of the foam core. The foam core 10 depicted in FIG. 1 may be made of any suitable foam material or other material selected that will not depart from the scope of the invention described herein.

Figure 2:
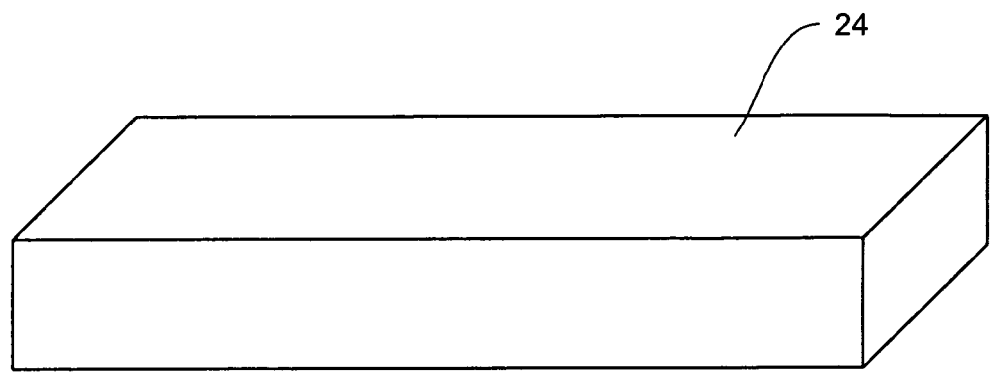
FIG. 2 depicts a foam block of the type capable of being processed for the purpose of making the foam core depicted in FIG. 1.
Figure 3:
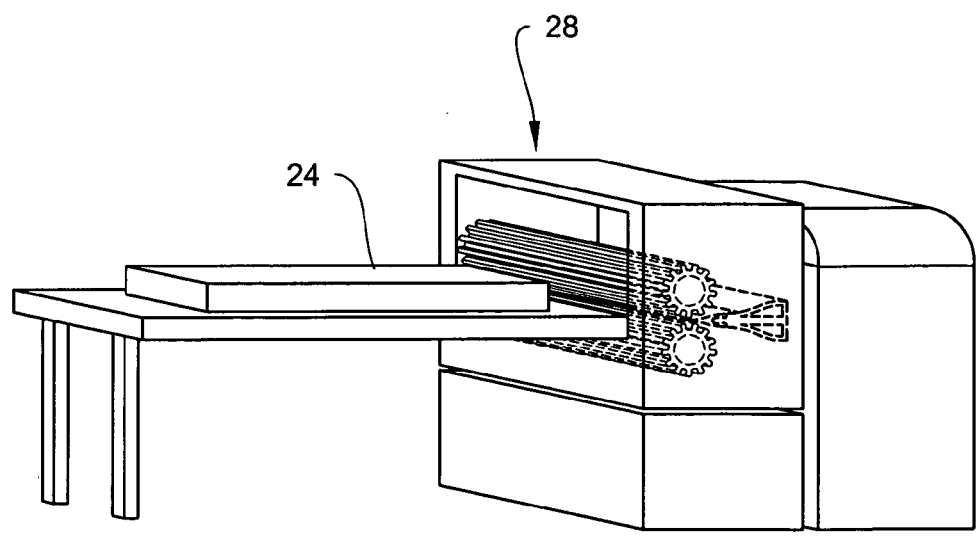
FIG. 3 depicts one embodiment of a convoluter of the type capable of processing foam.

The process for forming the foam core 10 depicted in FIG. 1 is illustrated through the FIGS. 2–5. Specifically, FIG. 2 depicts an unprocessed block of polyurethane foam 24. The unprocessed block of foam 24 may be processed on a convoluter machine 28 depicted in FIG. 3. The convoluter machine 28, as known to those of skill in the art, is capable of convoluting foam to provide an egg crate-like surface to the foam block 24. In the systems and methods described herein, the convoluter 28 is operated for the purpose of forming voids within the interior of the foam block 24, and preferably for forming channel cut voids that extend longitudinally, although they may extend horizontally, within the foam block 24.

Figure 4:
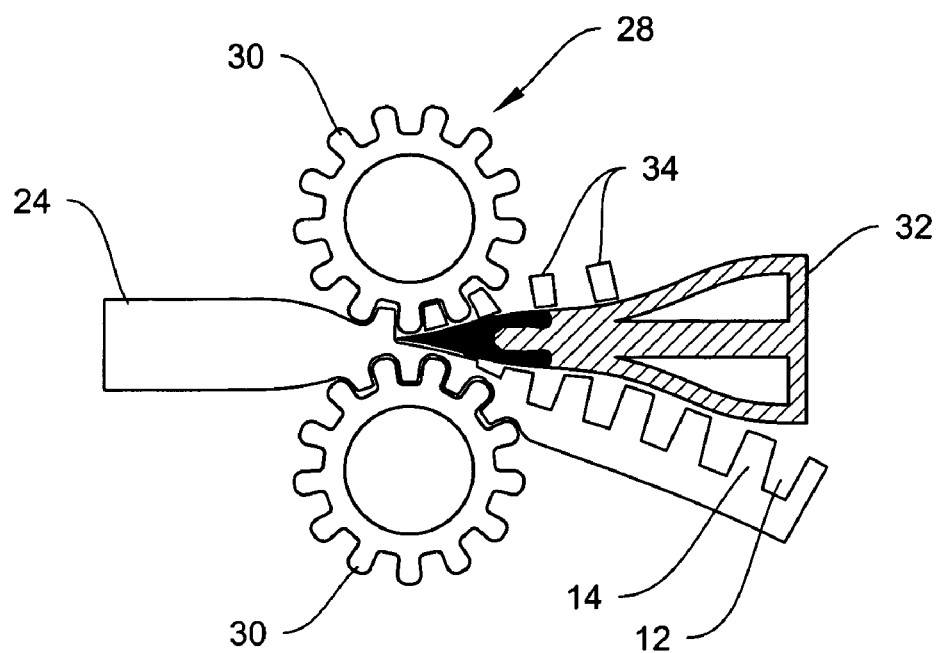
FIG. 4 depicts pictorially the operation of a convoluter constructed according to the invention for the purpose of forming voids within the interior of a foam block.

To this end, FIG. 4 depicts the foam block 24 being fed into the convoluter 28. In the illustration of FIG. 4 a side view pictorial representation of the convoluter 28 operating on the foam block 24 is presented. Specifically, FIG. 4 depicts the foam block 24 being delivered into the convoluter 28. The convoluter 28 has two rotors 30 each of which can spin and pull the foam block 24 into the convoluter 28. As further shown in FIG. 4, a cutting blade 32 can cut the foam block 24 at the point it is being pinched between the rotors 30 of the convoluter 28. By compressing the rotors the convoluter 28 pushes upward the material to be cut away and forms a foam tongue 34 equivalent to the material that would be interior to the channel 12 depicted in FIG. 1. The cutting blade can cut away and remove the tongue 34 for the purpose of forming a void within the foam core or block 24. This is depicted in more detail pictorially in FIG. 5.

Figure 5:
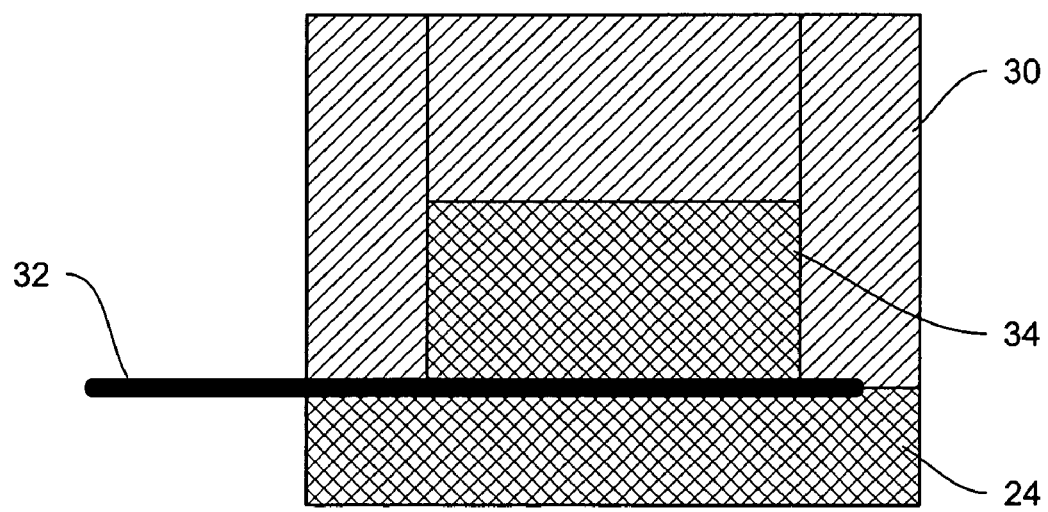
FIG. 5 depicts from a front on view the action of the convoluter depicted in FIG. 4.

Specifically, FIG. 5 shows the actions of the rotor 30 (showing only one rotor for ease of representation). As depicted in FIG. 5, the rotor 30 deforms the foam block such that a tongue 34 is formed. The tongue 34 represents the material that is being cut away from the foam core 10. To this end, the tongue 34 extends upwardly from the rest of the deformed foam block 24 and the cutting blade 32 can slice the tongue to remove the tongue material from the foam core 24. As shown in FIG. 4, a plurality of channels 12 can be formed by pulling the foam block 24 across its full width through the convoluter 28. As each new channel is to be formed, the cutting blade can slice along the length of the foam core 24 to form each channel. The amount and length of the channel can vary depending upon the length along which the cutting blade 32 slices away the tongue 34. Additionally, the cutting blade can slice a perforated pattern for the purpose of forming several groves or cut channels along a longitudinal access of the foam block 24. Other shapes and geometries of voids may be formed within the foam core using the technique described above with the necessary modifications and additions.

Figure 6:
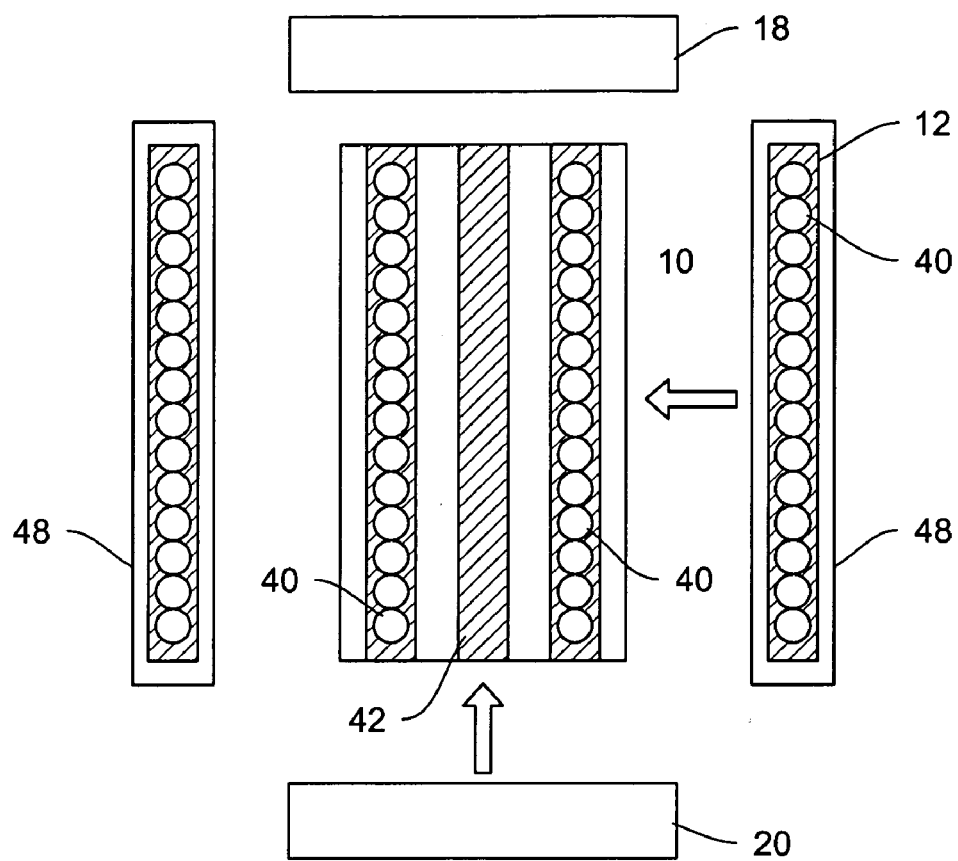
FIG. 6 depicts an optional embodiment in the invention wherein the foam core includes side rails, a head piece and a foot piece that may be attached to the foam core and wherein the foam core includes spring coils inserted within voids formed within the foam core and includes a foam support element supported within a void within the foam core.

Turning to FIG. 6, a process for the assembly of the foam core 10 into a mattress is depicted. Specifically, FIG. 6 depicts that after the foam core 10 is cut so that voids 12 appear within the foam core 10, support elements, such as the depicted springs 40 or foam of different ILD, such as the depicted foam 42, may be inserted into the voids 12 formed within the foam core 10. As also shown in FIG. 6, each of the foam core assemblies may have separate side rails 48 that can be attached, typically by glue or tape or some other adhesive process, to the side of the foam core 10. These side rails may be dimensionally adapted foam blocks for use as side rails 48. This is depicted by the arrow showing the side piece 48 being directed and joined to the adjacent side of the foam core 10. As also shown in FIG. 6, the side rail 48 may be a piece of foam that has a void 12 formed therein with optional support elements, such as the depicted springs 40 placed within the void. Accordingly, it will be understood that the systems and methods described herein may be used for forming foam mattress cores as well as forming foam head-rails and side-rails and other foam bodies that might be used for other kinds of furniture, such a futons, car seats, sofas, and other kinds of furniture.

As further depicted in FIG. 6, the side-rail pieces may be joined as well as the head-piece 18 and the foot-piece 20. As shown in FIG. 6, the head-piece 18 and foot-piece 14 may be joined to the respective ends of the foam core 10. In the embodiment shown, each of the foam head and foot pieces 18 and 20 are solid foam pieces that might be attached to extend across the width of the foam core 10 as well as the combined widths of the side-rails 48.

Figure 7:
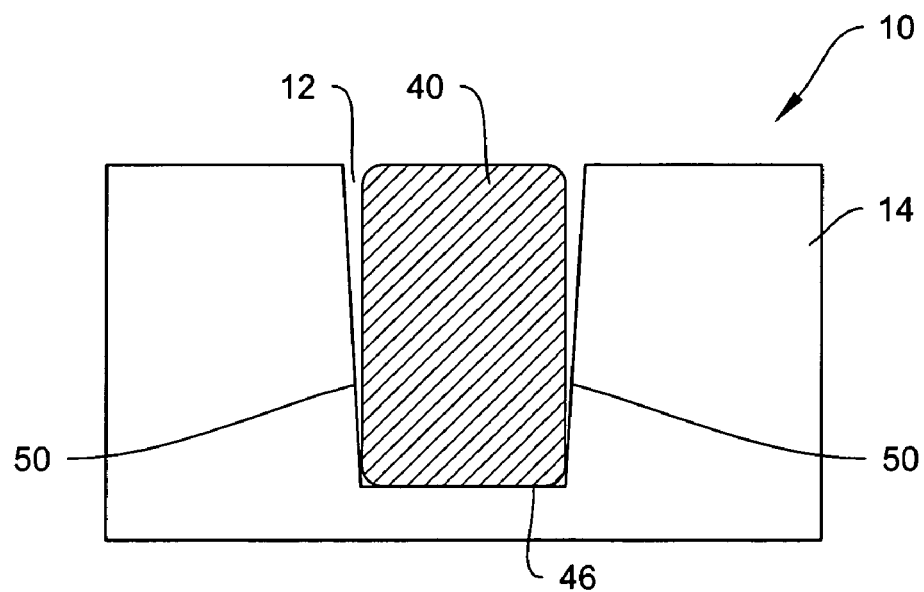
FIG. 7 depicts in more detail a spring coil fitted within a void formed within a foam core.

Turning to FIG. 7, a cross sectional view is depicted of the foam core 10 having a support element, in this case, a spring coil 40 located within the channel 12 that has been formed within the foam core 10. As shown in FIG. 7, the channel 12 is dimensionally adapted to have the spring 40 fit snugly within the channel 12. Optionally, an adhesive material, such as a glue or tape, may be applied to the side edges of the spring or support element 40 and joined to the interior side-walls of the channel cut 12. In this way, the springs might be held more firmly therein. The adhesive may be applied at the bottom wall 46 of the channel 12 or to the side-walls 50 or some combination thereof.

Figure 8:
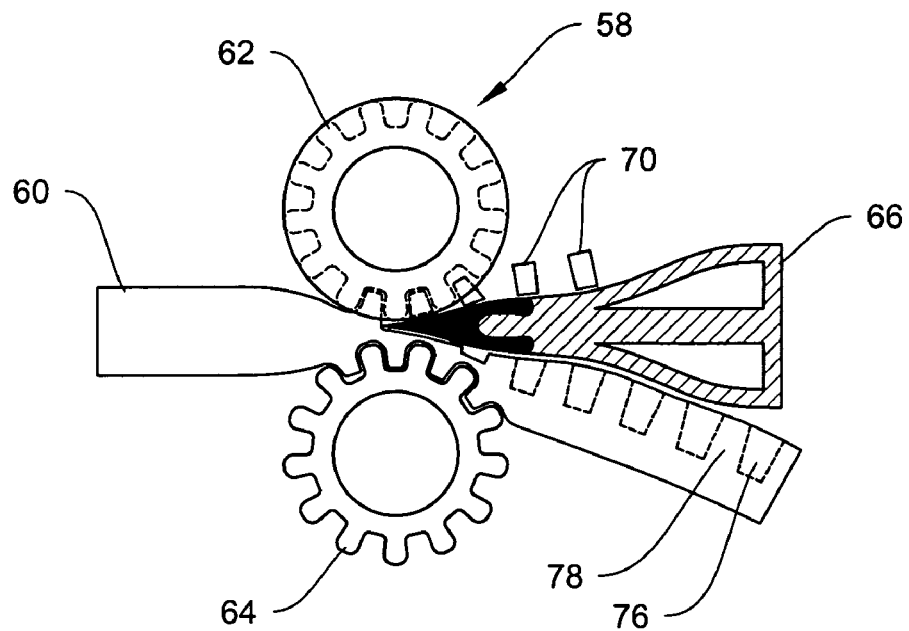
FIG. 8 depicts pictorially the operation of a convoluter constructed according another embodiment of the invention for the purpose of forming voids within the interior of a foam block.
Figure 9:
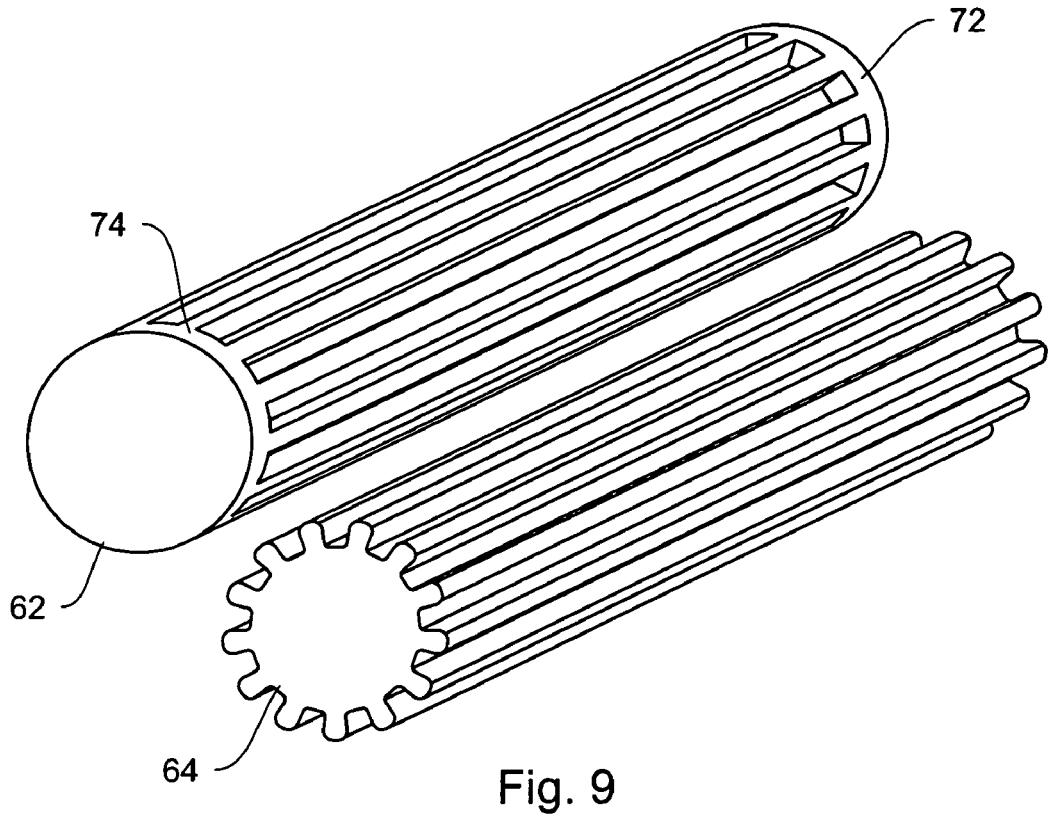
FIG. 9 provides an exploded perspective view of the rotors depicted in FIG. 8.

FIG. 8 depicts a convoluter 58 constructed according another illustrative embodiment for the purpose of forming voids 76 within the interior of a foam block 60 being fed into the convoluter 58. In the illustration of FIG. 8, a side view pictorial representation of the convoluter 58 operating on the foam block 60 is presented. The convoluter 58 has two rotors 62 and 64 respectively, each of which can spin and pull the foam block 60 into the convoluter 58. According to certain embodiments as shown in FIG. 9, rotor 62 may include head section 72 and foot section 74, each of which extend beyond the ends of rotor 64. The head section 72 and foot section 74 typically correspond approximately to the head section 18 and foot section 20 of a foam block 60 or foam block 10 of FIG. 1.

In operation, FIG. 8 depicts the foam block 60 being delivered into the convoluter 58. A cutting blade 66 cuts the foam block 60 at the point it is being pinched between the rotors 62 and 64 of the convoluter 58. By compressing the foam block 60 between rotors 62 and 64, the convoluter 58 pushes upward the material to be cut away and forms a foam tongue 70 equivalent to the material that would be interior to the channel 12 of FIG. 1. The head section 72 and foot section 74 of rotor 62 prevent material within the head section and foot section of foam block 60 from being pushed upward. The cutting blade cuts away and removes the tongue 70 for the purpose of forming a void 76 within the foam block 60. Between each void 76 is a support rail 78. Because the head section and foot section of foam block 60 are not pushed upwards, cutting blade 66 creates voids 76 that do not traverse the foam block 60, leaving a head section and foot section as depicted by head section 18 and foot section 20 of the foam core 10 in FIG. 1. In certain illustrative embodiments, the cutting blade 66, positioned between rotors 62 and 64, moves longitudinally, in either direction between the head section 72 and the foot section 74, or alternately in both directions, to cut out a tongue 70 after each step or incremental movement of the rotors 62 and 64.

Thus, the convoluter 58, using rotors 62 and 64, enables the manufacture of a foam core 10 having channel cuts or voids 12 with a head section 18 and foot section 20 as depicted in FIG. 1 immediately during the convolution process while eliminating the need to join a separate head-piece 18 and a foot-piece 20 as shown in FIG. 6.

Alternatively, in another illustrative embodiment, matching rotors 30, as depicted in FIG. 4, may be employed to manufacture a foam core 10 having a head section 18 and foot section 20 without the need to join a separate head-piece 18 and foot-piece 20. In operation, as shown in FIG. 4, the spin of the rotors 30 draws a foam block 24 having a longitudinal length greater than the length of the rotors 30 through the convoluter 28. The portions of the foam block 24 extending beyond the rotors 30 correspond to the head section 18 and foot section 20 of the foam core 10 of FIG. 1. In certain illustrative embodiments, a guide may be employed at each end of rotors 30 to crimp the head section and foot sections of the foam block 24 extending beyond the ends of the rotors 30 below the cutting blade 32 plane to prevent the resulting channel voids 12 from traversing the length of foam block 24, resulting in the creation of a head section and foot section during the convolution process. Again, the process described in the illustrative embodiment eliminates the need for and required step of joining a separate head-piece 18 and foot-piece 20 according to FIG. 6.

The systems and methods described and depicted herein are merely example embodiments of the systems and methods and processes that may be achieved within the invention. It will be understood that the invention includes the methods from manufacturing the foam core, a convoluter machine programmed and adapted to produce the foam cores described herein, and the foam cores and mattresses themselves. The invention also includes the software for controlling a convoluter to form the cores described herein. Additionally, it will be understood that the mattresses described herein may be one-sided or two-sided, may be adjustable and may include fire retardant barriers. Accordingly, the invention will be understood to be more than the embodiments depicted above.

What is claimed as new and desired to be protected by Letters Patent of the United States is:

1. A method of manufacturing a mattress comprising:
providing a foam block,
convoluting the foam between first and second matching rotors to form a tongue extending along the foam block; and
removing at least a portion of the tongue, to thereby form a channel within the foam block,
wherein the first rotor includes a plurality of matching projections being separated by a plurality of matching voids and the second rotor includes a plurality of matching projections, each matching projection opposing a matching void of the first rotor as the first and second rotors incrementally rotate, and
wherein the first rotor includes a head section, the head section extending longitudinally beyond a head end of the second rotor, the head section including a surface extending from the first rotor at a radial distance substantially the same as the plurality of matching projections of the first rotor.

2. A method according to claim 1, wherein the tongue extends longitudinally.

3. A method according to claim 1, wherein convoluting the foam includes delivering the foam block through a roller assembly including the first and second matching rotors for compressing a portion of the foam block.

4. A method according to claim 1, wherein removing at least a portion of the tongue includes a blade to slice through the foam.

5. A method according to claim 4, wherein the blade travels substantially along an edge of one of the first and second rotors.

6. A method according to claim 1, wherein removing at least a portion of the tongue includes removing a tongue extending across the foam block.

7. A method according to claim 1, wherein removing at least a portion of the tongue includes removing a tongue extending through a portion of the foam block.

8. A method according to claim 1, further comprising attaching an end piece to a foot section of the foam block.

9. A method according to a claim 1, further comprising attaching a head piece to a head section of the foam block.

10. A method according to claim 1, further comprising attaching a side rail to a side of the foam block.

11. A method according to claim 1, further comprising removing a section of the tongue to provide a channel formed between a head end and a foot end of the foam block.

12. A method according to claim 1, wherein providing a foam block includes providing a foam block of polyurethane or any suitable foam material.

13. A method according to claim 1, further comprising repeatedly convoluting the foam block and removing the tongue to provide a plurality of channels in the foam block.

14. A method according to claim 1, further comprising inserting spring coils within the channel.

15. A method according to claim 1, further comprising, providing a foam block dimensionally adapted for use as a side rail for a mattress core.

16. A method according to claim 1, further comprising, providing a foam block having dimensions adapted for use as a head piece or foot piece.

17. A method according to claim 1, further comprising providing a substantially rigid layer for supporting the foam block to thereby provide a one-sided mattress.

18. A method according to claim 17, further comprising, forming the substantially rigid layer from a plurality of foam layers.

19. A method according to claim 1, further comprising a fire retardant fabric barrier disposed over a top surface of the foam block.

20. A system for manufacturing a mattress comprising:
first and second matching rotors for i) receiving a foam block, ii) advancing the foam block as the rotors rotate, and iii) convoluting at least one tongue extending along the foam block as the rotors rotate, and
a blade extending at least partially between the first and second matching rotors for cutting the at least one tongue extending along the foam block as the first and second rotors rotate,
wherein the first rotor includes a plurality of matching projections being separated by a plurality of matching voids and the second rotor includes a plurality of matching projections, each matching projection opposing a matching void of the first rotor as the first and second rotors incrementally rotate, and
wherein the first rotor includes a head section, the head section extending longitudinally beyond a head end of the second rotor, the head section including a surface extending from the first rotor at a radial distance substantially the same as the plurality of matching projections of the first rotor.

21. The system of claim 20, wherein the blade is configured to move longitudinally from a first end of the rotors to a second end of the rotors during cutting.

22. The system of claim 21, wherein the blade is configured to move alternately from the first end to the second end and from the second end to the first end.

23. The system of claim 20, wherein the first rotor includes a foot section, the foot section extending longitudinally beyond a foot end of the second rotor, the foot section including a surface extending from the first rotor at a radial distance substantially the same as the plurality of matching projections of the first rotor.

* * * * *